United States Patent [19]
Arnstson et al.

[11] 3,897,848
[45] Aug. 5, 1975

[54] OCCUPANT KNEE RESTRAINT

[75] Inventors: Gary L. Arnstson, Lansing, Mich.; Lewis B. Campbell, Centerville, Ohio; Ronald H. Haas, Okemos, Mich.; Bard A. Miles; Arthur R. Sundeen, both of Lansing, Mich.

[73] Assignee: General Motors Corporation, Detroit, Mich.

[22] Filed: Oct. 15, 1973

[21] Appl. No.: 406,262

[52] U.S. Cl. ............................ 180/90; 280/150 B
[51] Int. Cl.² .................................... B60R 21/10
[58] Field of Search .... 280/150 B, 150 AB; 180/90; 74/492; 296/70, 72

[56] References Cited
UNITED STATES PATENTS

| | | | |
|---|---|---|---|
| 2,966,952 | 1/1961 | Wilfert | 180/90 |
| 3,341,248 | 9/1967 | Barenyi et al. | 296/70 |
| 3,439,769 | 4/1969 | Brilmyer | 180/90 |
| 3,498,402 | 3/1970 | Barenyi | 180/90 |
| 3,614,128 | 10/1971 | Sobkow | 180/90 |
| 3,702,081 | 11/1972 | Arnston | 74/492 |
| 3,702,706 | 11/1972 | Sobkow | 280/150 AB |

FOREIGN PATENTS OR APPLICATIONS

| | | | |
|---|---|---|---|
| 1,115,317 | 12/1955 | France | 280/150 B |

*Primary Examiner*—Kenneth H. Betts
*Assistant Examiner*—Jack D. Rubenstein
*Attorney, Agent, or Firm*—Herbert Furman

[57] ABSTRACT

A vehicle body includes an occupant compartment having an instrument panel and a collapsible energy absorbing steering column assembly. A rigid bracket structure extends rearwardly from the forward wall of the body and is releasably secured to the rear portion of the steering column which collapses relative to the forward portion under impact. A knee restraint for the driver includes a center portion which partially surrounds the rearward portion of the steering column, and knee deformable side portions extending to each side of the center portion. Flanges extend forwardly from the upper edges of the side portions and are secured to a tie bar laterally spanning the occupant compartment and located adjacent the lower edge of the instrument panel. A cover assembly covers such flanges and is releasably secured to other flanges extending from the upper edges of the side portions. A reinforcing member secured to the lower edge of the knee restraint is anchored to the body pillar and to the forward body wall. A U-shaped bracket secures the lower edge of the center portion of the knee restraint to the rigid bracket structure for the column assembly. A bracket extends from the rigid bracket structure and is fixed to the tie bar at approximately one-half the extent of the knee restraint laterally of the occupant compartment to ensure that both side portions are equally loaded by the driver's knees. The knee restraint includes a sheet metal base covered with a layer of foam material and an outer decorative covering. The foam material and covering control movement of the driver's knees relative to the restraint under impact to locate the driver's knees with respect to the base. Reinforcement plates secured to the side portions of the base and slots in such side portions permit adjustment of the side portions to a preset level of energy absorption capability.

5 Claims, 9 Drawing Figures

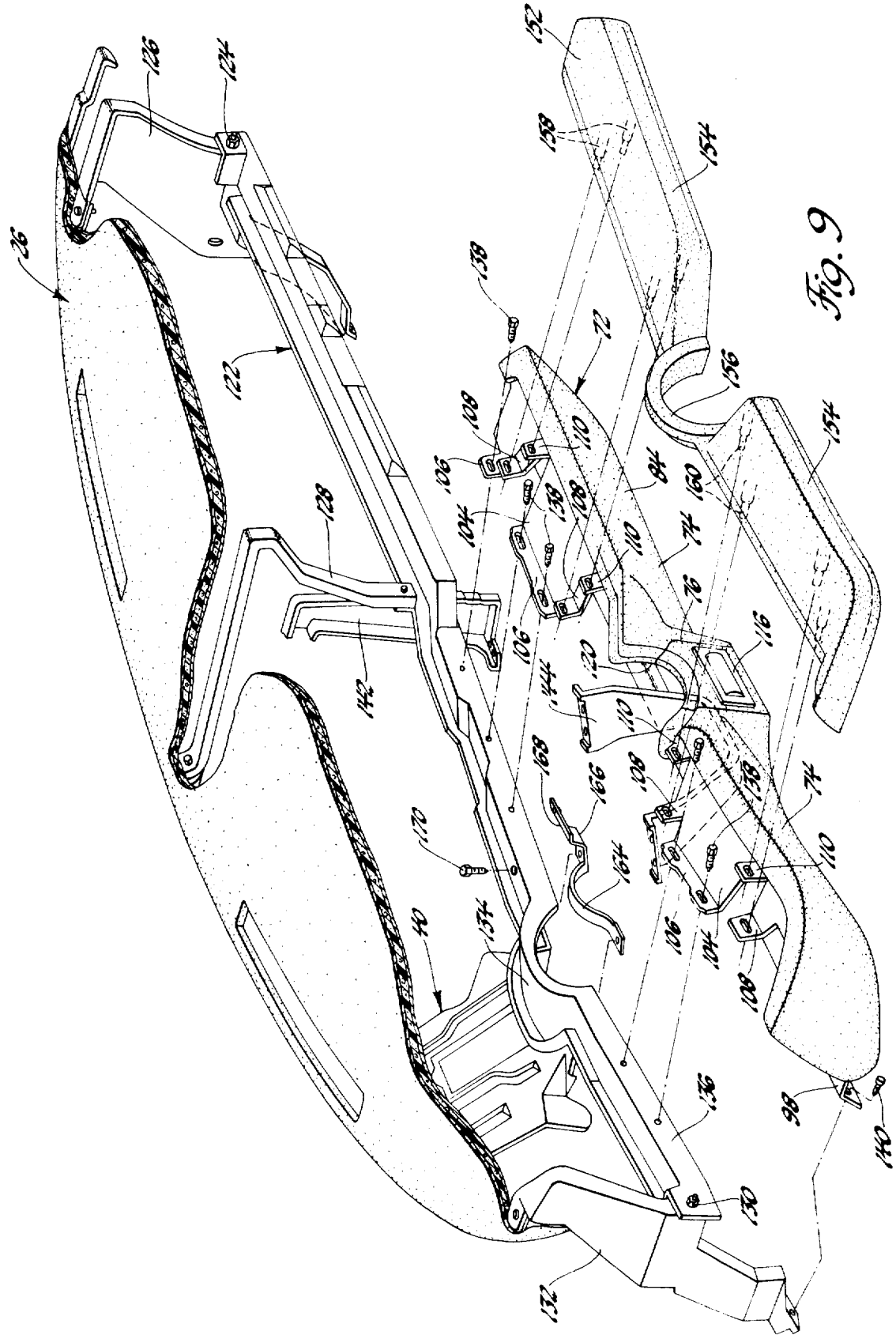

OCCUPANT KNEE RESTRAINT

This invention relates generally to a deformable knee restraint for seated vehicle occupants and more particularly to such a restraint which controls the kinematics of the occupant under impact conditions.

The knee restraint of this invention is an improvement over that shown in copending application Ser. No. 276,084 Arntson et al, filed July 28, 1972, and assigned to the assignee of this invention.

Knee restraints of this type may be provided for seated occupants and/or for the driver. The knee restraint for the driver generally includes a center portion partially encircling the rearward portion of the collapsible energy absorbing steering column assembly, and a pair of driver knee deformable side portions located to each side of the column assembly. The center portion is rigidly supported on the vehicle to block deformation thereof into the column assembly. The upper and lower edges of the side portions are rigidly supported on the vehicle to locate such edges under impact and ensure deformation of the side portions intermediate such edges by the driver's knees.

Generally, the knee restraint includes a formed sheet metal back plate which is plastically deformable, a layer of elastically deformable material, such as foam plastic, on the back plate, and an outer decorative covering of elastically deformable material, such as vinyl fabric, over this layer. The elastically deformable layer and decorative covering pocket the driver's knees under impact to control lateral or sliding movement thereof relative to the knee restraint and ensure plastic deformation of the sheet metal back plate. Such deformation absorbs the kinetic energy of the lower torso of the driver and applies a resultant compressive load longitudinally of the femurs of the driver to control the kinematics or movement of the upper torso of the driver with respect to the column assembly. If the column assembly is provided with a driver air cushion restraint system, the knee restraint will work equally as well when such cushion is inflated or when the cushion remains uninflated.

One feature of this invention is that it provides such a knee restraint for a vehicle driver wherein the upper edge portions of the knee deformable side portions of the knee restraint are spaced rearwardly from the vehicle instrument panel by support means and such support means is concealed by a cover assembly which can be installed and removed independently of the knee restraint. Another feature of this invention is that the knee restraint includes a center portion which partially encircles the steering column assembly, and the cover assembly likewise includes a center portion which encircles the remainder of the steering column assembly. A further feature of this invention is that the deformable portions of the knee restraint can be tuned to provide a preset level of energy absorption capability. Yet another feature of this invention is that such tuning is accomplished by providing slots in such deformable portions and reinforcement plates secured to the inner or forward surfaces of the deformable portions. Yet a further feature of this invention is that the support means connects the upper edge portions of the side portions of the knee restraint and a tie bar spanning the occupant compartment. Still another feature of this invention is that the tie bar is secured to the column support bracket structure for the column assembly in a manner ensuring that the side portions of the knee restraint are equally loaded by the driver's knees. Still a further feature of this invention is that such securement is provided by a bracket structure extending from the column support bracket structure and fixed to the tie bar at a point approximately one-half the lateral extent of the knee restraint with respect to the occupant compartment.

These and other features of the invention will be readily apparent from the following specification and drawings wherein:

FIG. 9 is an exploded perspective view.

Figure 1:
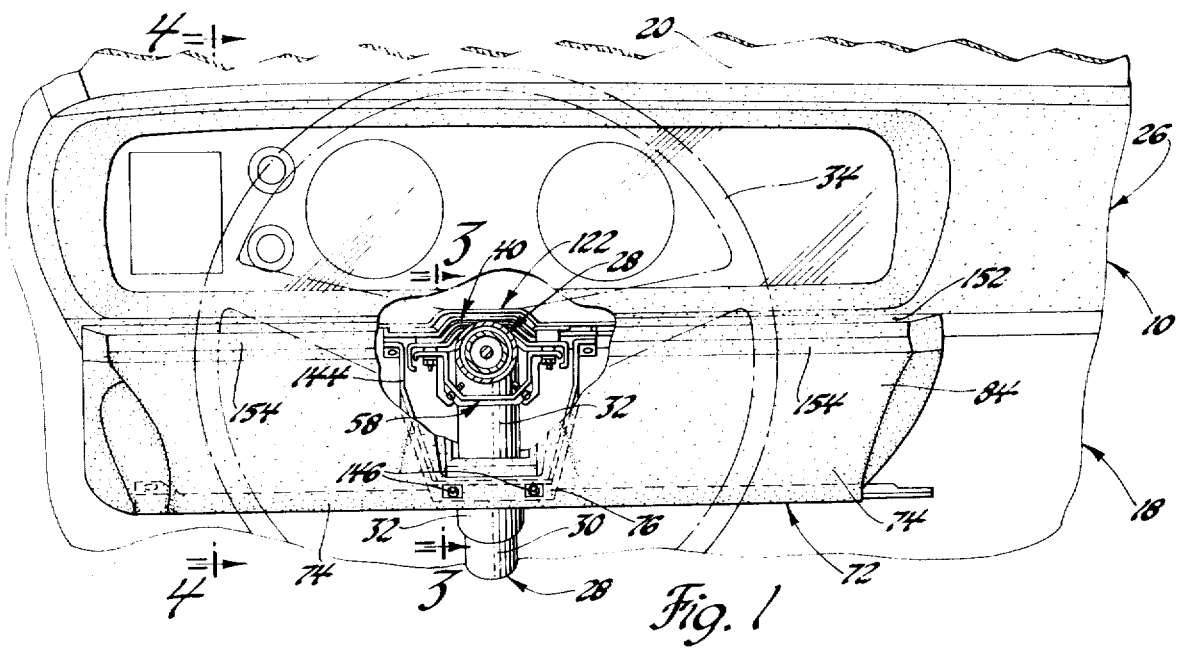
FIG. 1 is a partial elevational view of a portion of the driver's side of the occupant compartment and showing a partially broken away driver knee restraint according to this invention.
Figure 4:
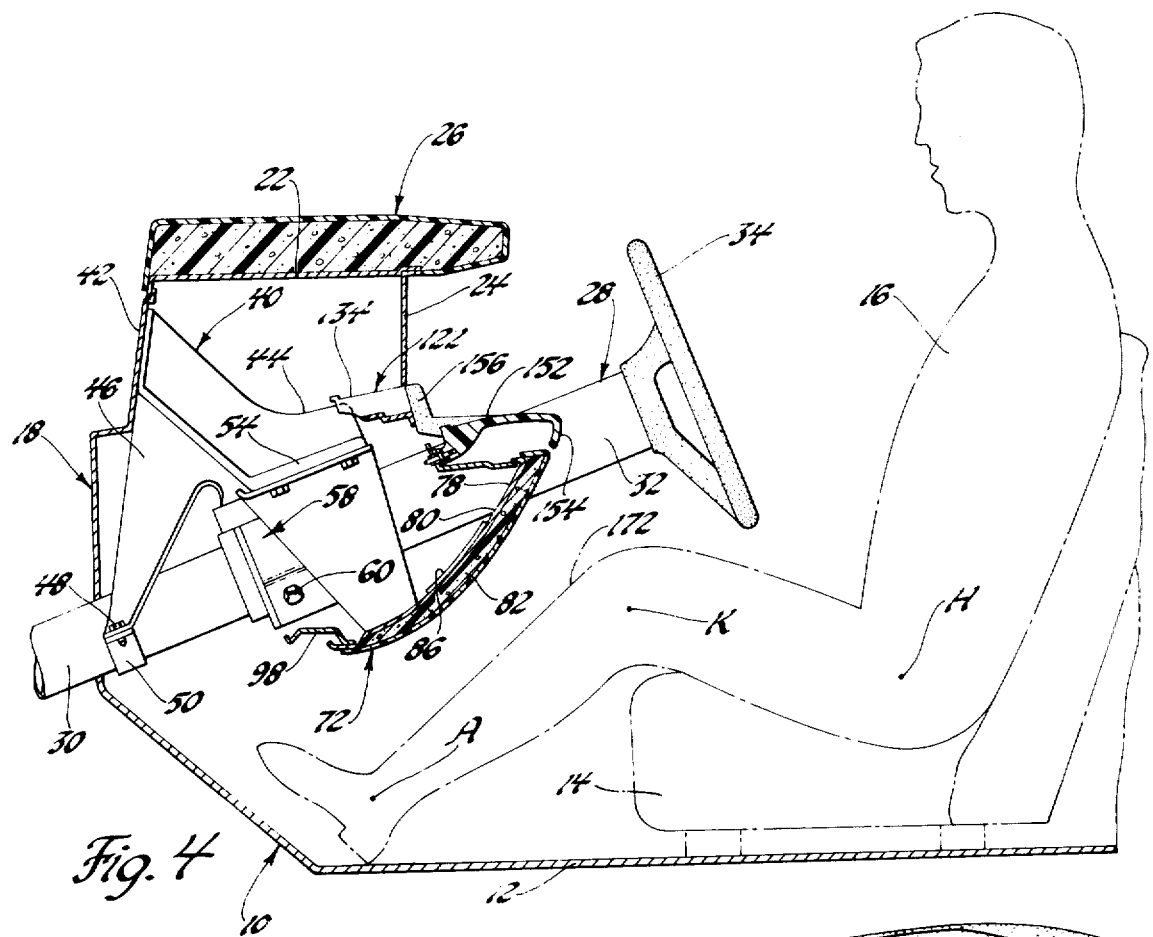
FIG. 4 is a sectional view showing the relationship of the driver to the knee restraint and steering column assembly taken generally along the plane indicated by line 4—4 of FIG. 1.

Referring now to FIGS. 1 and 4, a vehicle designated generally 10 includes a floor pan 12 which supports a schematically indicated conventional front seat 14 for supporting the vehicle driver 16 in seated attitude. The vehicle likewise includes a forward wall 18 which is conventionally known as a fire wall or cowl structure and a windshield 20 which extends upwardly and rearwardly of the vehicle. An upper wall portion 22 and a rear wall portion 24, together with the remainder of wall 18, provide the instrument panel 26 of the body. The upper wall of the instrument panel is conventionally covered with suitable energy absorbing material and an outer decorative covering.

The vehicle 10 further includes an energy absorbing steering column 28. The column 28 is the same as that disclosed in detail in U.S. Pat. No. 3,702,081 Arntson, issued Nov. 7, 1972, and assigned to the assignee of this invention. Only a brief description of the column necessary for an understanding of this invention will therefore be given.

The column 28 includes a forward portion 30 which is rigidly secured at its lower end to a portion of the wall 18. The column 28 further includes a rearward portion 32 which is telescopically related, as shown, to the portion 30 and is adapted for movement axially thereof and forwardly of the vehicle during collapse of the column when loaded by the driver 16. The column portions 30 and 32 are interconnected by conventional means which normally maintains them against relative telescopic movement and absorbs energy during such movement. A conventional steering wheel 34 is rotatably mounted on the column portion 32 and is secured to the conventional steering mechanism of the body by a steering shaft 36 shown in FIG. 8. Also as shown therein, a shift tube 38 concentrically surrounds the shaft 36 to connect the shift lever mechanism with the transmission.

Figure 8:
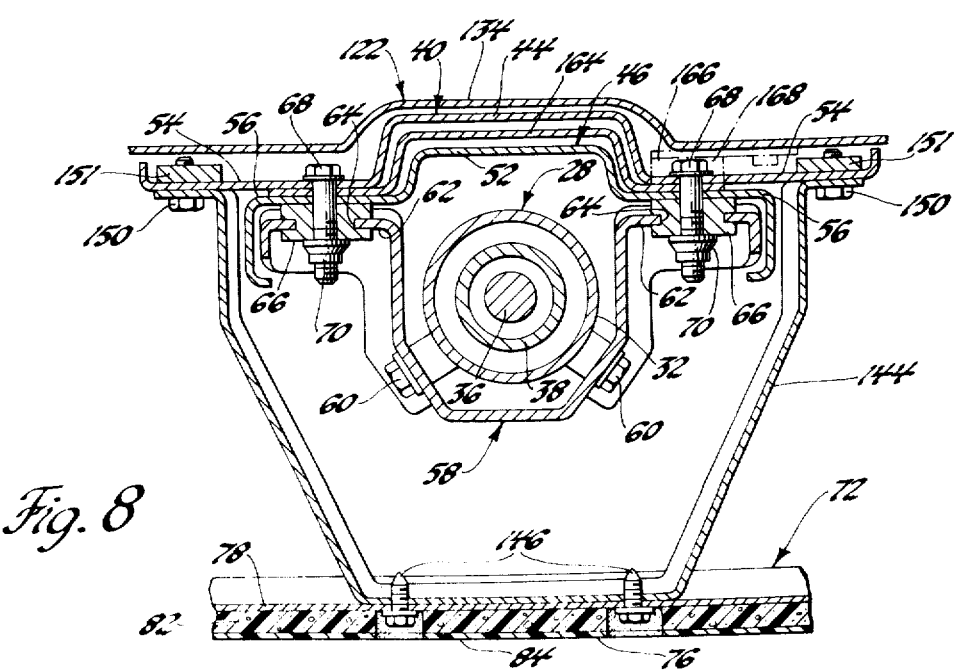
FIG. 8 is an enlarged view of a portion of FIG. 1.

A steering column support bracket 40 has its forward end rigidly secured to a wall portion 42, FIG. 4, of wall 18 adjacent the wall portion 22. The rearward end portion of the bracket 40 is offset and shaped to provide a flattened generally U-shaped portion 44, FIGS. 3 and 4, which spans the portion 32 of the steering column 28. A steering column guide bracket 46 is conventionally bolted to bracket 40, not shown, and secured to column portion 30 by bolts 48 and bracket 50, FIG. 4, to support this column portion on wall 18. The rearward offset portion 52 thereof is shaped in generally the same manner as the portion 44 of bracket 40 and fits therewithin in spaced relationship, as shown in FIG. 8. Respective lateral flanges 54 and 56 of portions 44 and 52 are located to each side of the column portion 32 and provided with aligned apertures. A generally U-shaped bracket 58 is suitably bolted at 60 to the column portion 32 and includes lateral flanges 62 which are slotted at 64, with the slots 64 being closed at their forward ends with respect to the body and open at their rearward ends with respect to the body. A side slotted mounting capsule 66 is slidably received in each of the slots 64 and is releasably secured to a respective flange 62 by a series of plastic shear pins, not shown, which may be injection molded within aligned apertures in the capsules and in the flanges. Each capsule includes a closed slot. A bolt 68 extends through the aligned apertures in the flanges 54 and 56 of the bracket portions 44 and 52 and the closed slots in each capsule 66 and is retained by a nut 70 to support the column portion 32 on the forward wall 18 of the body.

When the steering wheel 34 is engaged by the upper torso of the driver 16 with a predetermined force, the resultant load is transferred from the steering wheel to the upper column portion 32 through the hub of the steering wheel. When the component of this load which is directed axially of the column reaches a predetermined minimum magnitude, the plastic shear pins which interconnect the flanges 62 and the capsules 66 are fractured and the column portion 32 is thereby released for movement axially of the column portion 30 as the energy absorbing means connecting the column portions functions to absorb the energy of the axial load. During such movement, the bracket 58 moves with the column portion 32 and the flanges 62 slide along and are guided by the bracket portion 52 of bracket 46 after the flanges are released from the slots of the capsules. It can be seen from FIG. 8 that flanges 62 are provided with side extensions which are received within generally L-shaped side extensions of flanges 56 to control movement of column portion 32 laterally or downwardly of column portion 30.

Although not shown herein, it will be understood that the steering column 28 and particularly the steering wheel 34 may mount a driver air cushion restraint system, such as that shown in copending application Ser. No. 291,698 Dunford et al, filed Sept. 25, 1972, and assigned to the assignee of this invention. In such a system, the cushion is inflated only at a predetermined level of impact force received by the vehicle or a predetermined velocity change of the vehicle. The steering column 28 will function to absorb the kinetic energy of the upper torso of the driver whether loaded directly by such upper torso or loaded indirectly through the inflated cushion of the restraint system. As will be understood from a further description, the knee restraint likewise performs equally as well regardless whether such a driver cushion is or is not inflated.

From the foregoing description, it can be seen that the performance of the steering column 28 is dependent upon the axial component of the impact load applied to the column by the driver. It is therefore desirable that this load be applied coaxially of the column or with minimum deviation therefrom. In order to accomplish this, the kinematics of the driver 16 should be such that the upper torso of the driver rotate in a forward direction relative to the vehicle about the H point or hip axis indicated in FIG. 4 and that the lower torso of the driver move only a limited distance forwardly on the seat 14, whereby the driver remains on the seat and maximum rotation of his torso about the H point will occur.

It is known from biomechanical data that the femurs of a person are capable of taking compressive loads up to various limits. With respect to FIG. 4, it can be seen that if such compressive load is applied axially of the femurs of the driver during the duration of the impact of the driver's knees with the knee restraint 72, according to this invention, it will aid in producing maximum forward rotation of the upper torso of the driver about the H point and aid in positioning the upper torso so that it will apply an impact load generally coaxially of the column 28.

The movement of the driver 16 under impact conditions is explained in detail in the aforenoted Arntson application. Therefore, only a brief description will be given herein.

In FIG. 4, the H point or hip axis of the driver is indicated by the letter H, the K point or knee axis is indicated by the letter K, and the A point or ankle axis is indicated by the letter A. It is assumed that the driver's legs are laterally aligned so that the H, K and A points of the driver's legs are coaxial. Full lines connecting the H, K and A points would indicate the normal seated position of the driver under nonimpact conditions. The driver's feet are normally located adjacent the toe pan portion of the wall 18 as shown. Although his feet may move slightly forwardly under impact conditions, the A points can be considered relatively stationary during such conditions. Under impact conditions, the lower legs of the driver swing forwardly and upwardly of the vehicle about the A points so that the K points move upwardly and forwardly in an arc about the A points. The upper leg portions of the driver concurrently move forwardly and upwardly of the vehicle so that the H points move forwardly of the seat, and the angularity of the axes K-H of the femurs decreases with respect to the axes K-A of the lower leg portions. The engagement of the frontal surface of the driver's knees with the knee restraint 72 should be such that the resultant compressive load is applied axially of the femurs of the upper leg portions of the occupant or coaxially of a line connecting the points K and H. Such a resultant compressive load will aid in producing maximum forward rotation of the upper torso of the driver about the H point as it moves forwardly of the seat.

The occupant knee restraint 72 is engageable by the frontal surfaces of the knees of the driver to absorb as much of the driver's kinematic energy as possible by impact deformation and to also apply a resultant compressive load longitudinally of the femurs of the driver within predetermined limits to thereby control the attitude of the driver with respect to the steering column as previously set forth and in turn ensure maximum performance of such column. The knee restraint is located so as to be engaged by the knees of the driver very early under impact conditions. The deformable portions of the knee restraint are designed to build up force with little displacement and thereafter yield at a substantially constant force, resulting in maximum energy dissipation with minimum displacement. This restricts movement of the lower torso of the driver relative to the seat and produces the desired rotation of the upper torso as soon as possible and in the appropriate direction. Thus the energy absorbing steering column collapse will absorb a major part of the impact load applied by the driver's torso to the column since the load will be applied substantially coaxially of the column.

Surveys have shown that the distance between the frontal surfaces of a driver's knees and the knee restraint 72 remains fairly constant regardless of the height, weight, or percentile of the driver since the length of the lower torso determines the position of the seat and the driver's feet are restricted in position by the vehicle controls. The "knee spread" or distance between either knee and the steering column centerline increases as either the height or weight of the driver increases.

The knee restraint 72 generally includes a pair of knee deformable side portions 74 interconnected by a center portion 76. The knee restraint is asymmetrical about the axis of the center portion which is coplanar with the axis of the steering column 28. While the right-hand side portion 74 is of greater extent laterally of the occupant compartment, both are of the same construction, unless otherwise noted.

Figure 6:
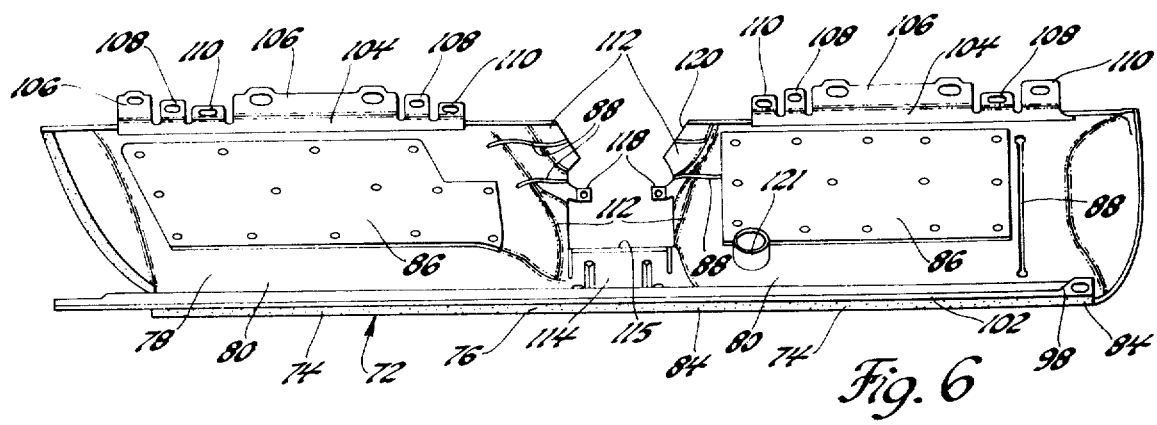
FIG. 6 is a rear elevational view of the knee restraint shown in FIG. 2.
Figure 7:
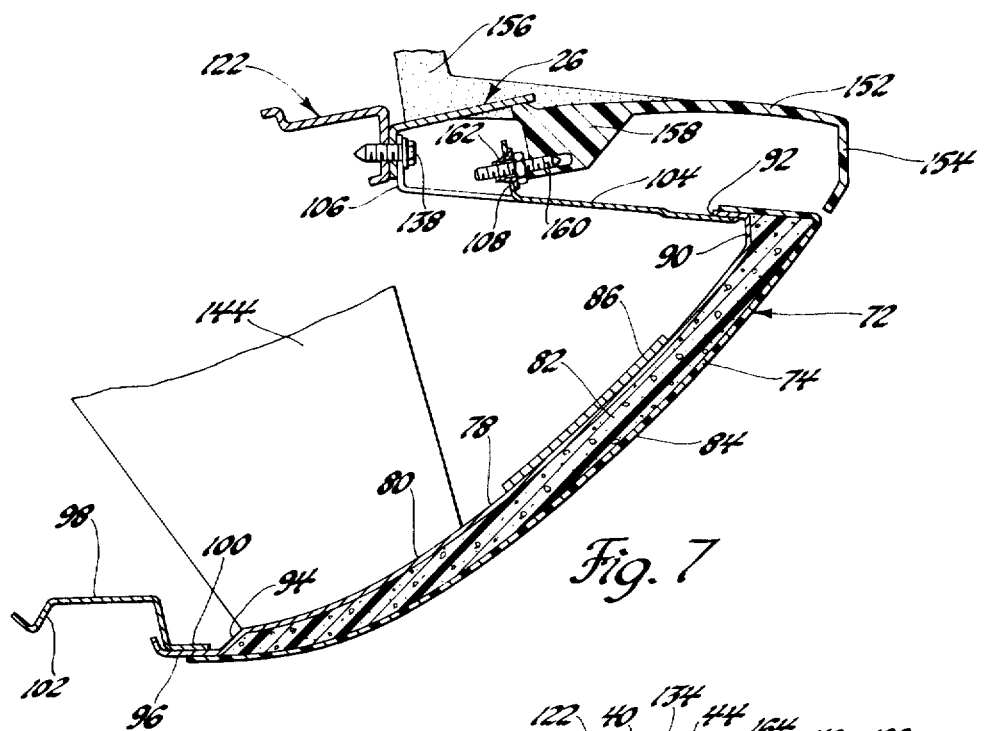
FIG. 7 is an enlarged view of a portion of FIG. 4.

Generally, as shown in FIGS. 4, 6, and 7, the restraint 72 includes a formed metal base or back 78 having knee deformable side portions 80 capable of energy absorption with square wave efficiency typical of a rigid low density foam. The base is covered with a layer of soft foam material 82 which in turn is covered with an outer decorative covering 84. Additionally, the foam material provides for load distribution over the metal base under non-normal impacts and aids in "pocketing" the driver's knees to control lateral sliding movement relative to the knee restraint. The outer decorative covering is preferably of vinyl or a material having similar tensile strength so as to obtain a "hammock" effect and aid the foam material in distributing the load over the metal base. It also aids the foam material in pocketing the driver's knees to reduce lateral sliding movement relative to the knee restraint. The knee deformable side portions of the base have frontal surfaces which are located in generally parallel relationship to the frontal surfaces of the driver's knees. The pocketing of the driver's knees ensures that the load vectors are directed axially of the femurs of the driver. The side portions 80 are additionally provided with reinforcement plates 86, spot welded to the forward or inner surface thereof, and slots 88 in order to "tune" these side portions for energy absorption capability at a particular level of impact force with square wave efficiency.

As best shown in FIG. 6, the metal base 78 of the knee restraint comprises a one-piece stamping of thin sheet metal, such as 0.035 inch stock. Such material is capable of excellent energy absorption upon impact therewith by the driver's knees. From FIG. 7 it will be noted that the side portions 80 are generally of slightly arcuate cross section and extend generally angularly to the vertical. Each of the side portions 80 is provided at its upper edge with integral flanges 90 and 92 and at its lower edge with integral flanges 94 and 96, the latter flanges being continuous across the lower edge of the back. The flanges 90 and 92 terminate at the center portion of the knee restraint as shown in FIG. 6. A generally U-shaped reinforcing member 98 extends along the lower edge portion of the base 78 and has a flange 100 thereof welded or otherwise fixed to the flange 96. The free leg 102 of member 98 is offset throughout the length thereof except at the left-hand end thereof as shown in FIGS. 6 and 9 wherein it is flattened and apertures. This provides for attachment of the member and the knee restraint to the left-hand body pillar as will be further described. The right-hand end of the member 98 extends beyond the right-hand end of the knee panel as shown in FIG. 6 and is attached to the body wall 18 as will be further described.

As best shown in FIGS. 7 and 9, a laterally flanged member 104 is secured to the flange 92 of each of the side portions 80 of the base 78. Lateral flange 106 of these members are provided with slots for attachment of these members and the knee restraint to a tie bar as will be further described. Other flanges 108 and 110 of these members are likewise provided with slots for attachment to a cover assembly as will be further described.

The knee deformable side portions 80 of the base 78 merge arcuately into the side walls 112 of the center portion 76 of the knee restraint and also merge into a generally planar base wall 114 of the center portion, which may be provided with ribs as shown in FIG. 6 for strengthening purposes. The side walls 112 and the base wall 114 define a generally rectangularly shaped opening 115 which may receive and retain an air conditioning outlet 116 as shown in FIG. 9. Lateral apertured tabs 118 of walls 112 provide for attachment of the outlet to the knee restraint. If such an outlet is not provided, then the opening 115 may be closed by a cover plate. Walls 112 also define an arcuately shaped opening 120 which receives the lower half of column portion 32 therethrough when the knee restraint 72 is installed.

The outer decorative covering 84 is of vinyl fabric and will, of course, aesthetically and colorwise match the interior trim of the occupant compartment of the vehicle. This covering is cemented or otherwise adhesively secured to the flanges 92 and 96, respectively, along the upper and lower edges of the base 78. The covering at the center portion 76 extends over and is adhesively secured to the walls 112. The covering at the right-hand edge of base 78 is secured to the outer surface of side portion 80 while the covering is wrapped over the edge of the left-hand side portion 80 and secured to the inner or forward surface thereof. The layer 82 of soft foam material may be provided by foaming in place in the space between the base 78 and the covering 84 after the latter is installed, or may be provided by a separately formed layer of the material. If this layer is foamed in place, then a suitable sprue 121 can be provided in an aperture in the base 78.

The layer 82 of foam material, such as foam urethane or foam vinyl, is approximately one-half inch thick in the impact areas of the side portions 80 of the knee restraint. It terminates short of the wall 112 and thins out over the wall 114 of the center portion 76. This layer of foam material absorbs very little energy under impact conditions other than normal. Its primary purpose, in combination with the covering, is to aid in distributing the load from the driver's knees over the side portions 80 of the knee restraint and to also aid in pocketing the driver's knees with respect to these portions of the knee restraint to reduce lateral sliding movement of the driver's knees relative to the knee restraint as previously mentioned. Other materials than vinyl fabric may be used for covering 84, provided that they have the tensile strength of vinyl fabric and will not rupture upon impact. Likewise it should be noted that the foam material and covering absorb the energy of normal impacts of the driver's knees against the knee restraint under loads less than those requiring deformation of the metal base 78 in order to absorb the kinetic energy of the driver.

With reference now to FIG. 9, a tie bar 122 of generally L-shaped cross section spans the occupant compartment of the vehicle between the right-hand and left-hand front door body hinge pillars thereof. The right-hand end of this tie bar is bolted at 124 to a bracket 126 which in turn is bolted in a conventional manner to the right-hand body hinge pillar. This bracket also supports the upper wall portion 22 of the instrument panel 26. The center portion of the tie bar is anchored to the wall portion 42 of wall 18 by a generally L-shaped bracket 128 which also supports wall portion 22. The left-hand end of the tie bar is bolted at 130 to a bracket 132 which also supports wall portion 22. Bracket 132 is conventionally bolted to the left-hand body hinge pillar. It will be noted with reference to FIG. 9 that the tie bar includes an arcuate portion 134 which extends over the bracket 40 and particularly the portion 44 thereof.

When the knee restraint 72 is installed on the vehicle, the flanges 106 of members 104 are seated against the leg 136 of the tie bar and are bolted at 138 thereto. The slots in the flanges 106 provide for alignment of the bolts with respect to apertures in the tie bar. The bolts 138 may also secure the lower edge of the facia of the instrument panel 26 to the tie bar, as indicated in FIG. 6.

Figure 2:
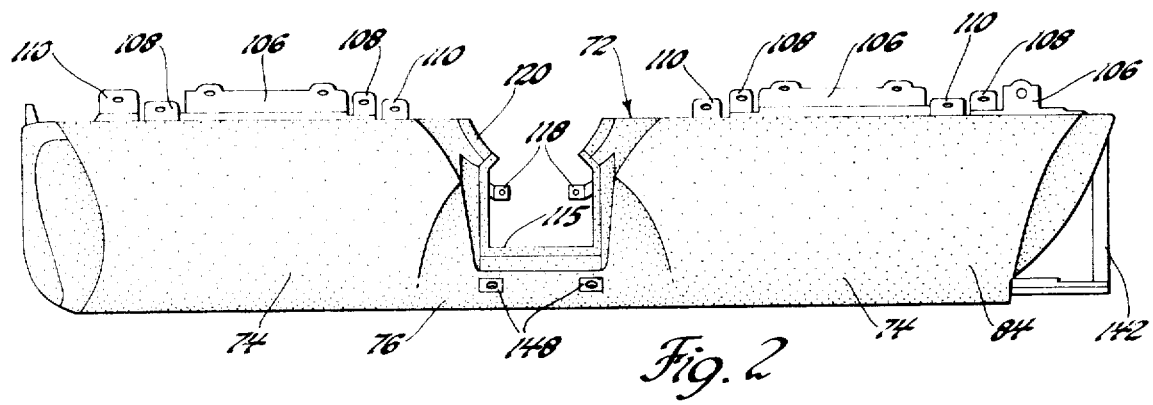
FIG. 2 is an enlarged view of the knee restraint of FIG. 1.
Figure 5:
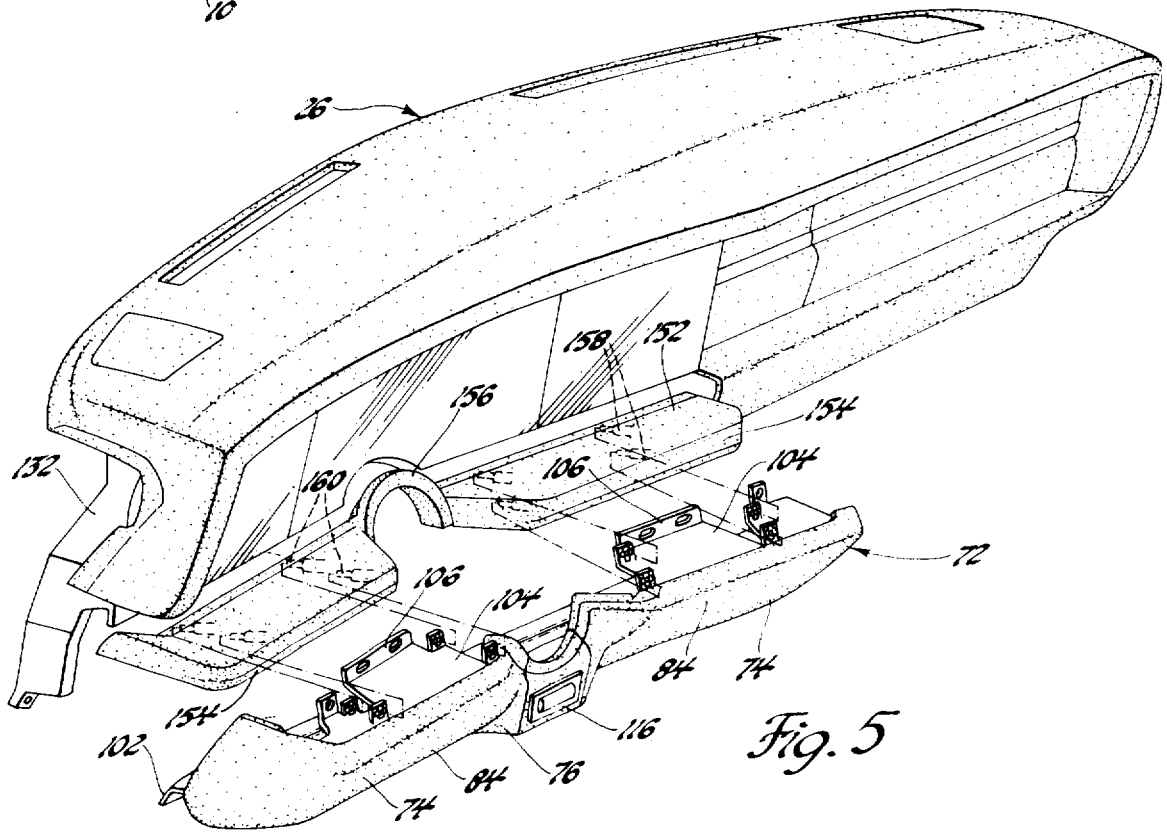
FIG. 5 is a partially exploded perspective view showing the knee restraint with respect to the cover assembly and instrument panel.

The apertured left-hand end of the lower reinforcing member 98 is bolted at 140 to the bracket 132 and the outwardly extending right-hand end of this reinforcing member is bolted to a bracket 142 which extends rearwardly from the forward wall 18. It will be noted with reference to FIGS. 2 and 9 that the left-hand end portion of the knee restraint is suitably shaped so as to blend in to the left-hand hinge pillar of the vehicle, and is slightly hollow or concave to provide access to the left-hand door window regulator handle, not shown. The right-hand end portion of the knee restraint likewise may be suitable shaped so as to blend in to a knee restraint provided for the center and right-hand passengers of the vehicle or into a valence panel for such passengers, as shown in FIG. 5. These end portions are not in the impact area.

Figure 3:
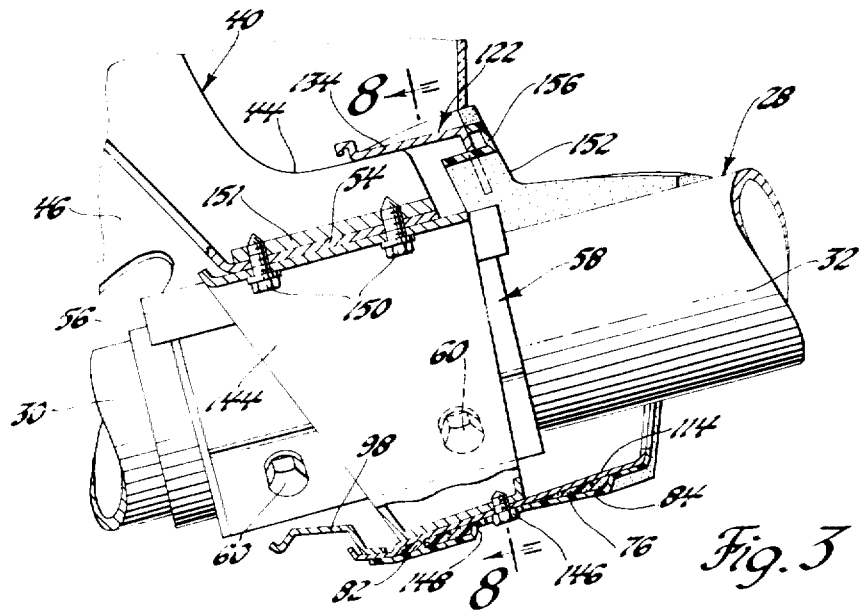
FIG. 3 is an enlarged sectional view taken generally along the plane indicated by line 3—3 of FIG. 1.

A generally U-shaped bracket 144 has its base bolted at 146 to the wall 114 of the center portion 76, as shown in FIGS. 3 and 8. The covering 84 is depressed against wall 114 and secured thereto in this area as indicated at 148 in FIGS. 2, 3, and 8. The flanged legs of this bracket encircle the column portion 32 as shown in FIG. 8 and seat against the flanges 54 of the bracket 40. Bolts 150 secure the flanges of the bracket legs to tapped blocks 151 which are secured to the flanges 54.

The bracket 144 secures the center portion 76 of the knee restraint to the column support brackets 40 and 46. This ensures that any engagement of the driver's knees with the center portion 76 will not deform the center portion into the rearward portion 32 of the column 28 and thereby possibly interfere with energy absorbing collapse of this rearward portion relative to the forward portion. This ensures that the performance of the steering column is independent of any deformation of the knee restraint by the driver.

With reference now to FIGS. 7 and 9, a cover assembly 152 of molded plastic covers the members 104 and the flanges 106, 108, and 110. The flanges 154 of the cover assembly seat on or are located closely adjacent to the upper edge of the knee restraint. The semicircular center portion 156 of the cover assembly is of U-shaped cross section and encircles the upper half of the steering column portion 32. Portion 156 seats against the arcuate portion 134 of the tie bar and extends over the opening 120 of the knee restraint. The cover assembly includes a plurality of integrally molded depending apertured lugs 158, one being shown in FIG. 7. Each lug receives an adjustable threaded member 160. The slots in the flanges 108 and 110 receive conventional barrel nuts 162. When the cover assembly is installed, the members 160 are received within their respective barrel nuts 162 to thereby releasably attach the cover assembly to the knee restraint. The slots in the flanges 108 and 110 provide for alignment of the members 160 with their respective barrel nuts. The cover assembly has no energy absorbing function. It covers the upper mounting means for the knee restraint and cooperates with walls 112 thereof in encircling column portion 32 since the walls encircle the lower half of this column portion and are generally coplanar with the outer surface of center portion 156. The cover assembly permits the knee restraint to be mounted rearwardly of the instrument panel of the vehicle to ensure that sufficient crush space is provided forwardly of the side portions 74 of the knee restraint. Additionally, it permits the instrument panel to be shaped to whatever shape is desired without requiring that the knee restraint match such shape or contour.

The extent of the plates 86 and the slots 88 as well as the location thereof is controlled by the energy absorbing capability level intended for the knee restraint. The plates 86 cover the knee impact areas of the side portions 80 and are spot welded to the base 78, as previously mentioned. The thicknesses of these plates 86 are chosen to achieve the desired load versus crush distance relationship to achieve maximum deceleration of the lower torso without exceeding the desired maximum femur loads. The slots 88 are formed when the base 78 is formed.

A U-shaped bracket 164, FIGS. 8 and 9, fits between the portions 44 and 52 of brackets 40 and 46 and is bolted thereto by bolts 68 and nuts 70 to clamp the bracket between flanges 54 and 56. The bracket includes an offset 166 and a lateral apertured extension 168 provided with a nut welded thereto. The extension nut receives a bolt 170, FIG. 9, which extends through the tie bar 122 to the right of portion 134 to secure the tie bar to the column brackets.

The tie bar 122 supports the upper edge of the knee restraint through the members 104 and therefore is loaded when the knee restraint is impacted and deformed by the driver's knees. It will also be remembered that the left-hand portion 74 of the knee restraint is of lesser extent laterally of the occupant compartment than the right-hand portion. Thus the applied loads by the driver's knees on the former portion are greater than on the latter with respect to the center of the knee restraint center portion 76. The bolt 170 is located at a point approximately one-half the lateral extent of the knee restraint to thereby ensure that the tie bar is equally loaded by both portions of the knee restraint when impacted and deformed by the driver's knees.

FIG. 4 shows the relationship of the frontal surface 172 of the left-hand knee of the driver 16 to the frontal surface of the left-hand side portion 74 of the knee restraint. It will be noted that the surface 172 of the driver's knee is located generally parallel to the frontal surface of portion 74 and to portion 80 of the base 78. This occurs even though the side portion 74 is slightly angled as previously noted. The spacing of the knee to the knee restraint will vary with driver percentile and may range from approximately 1¾ inches up to 3½ inches. Preferably the spacing should be kept as minimum as possible since it is desirable to instantaneously square the resultant load versus displacement curve which results from engagement of the driver's knee with the portion 74 of the knee restraint in order to absorb as much of the driver's kinetic energy as possible. However, such instantaneous squaring of the curve would require instantaneous contact of the driver's knee with the knee restraint. This is not possible when considering entrance into the vehicle and comfort of the percentile range of drivers. A square wave loading should be maintained at a minimum possible load during the duration of the impact of the driver's knee with the knee restraint. Such impact will result in minor deformation of the portion 80 for a fifth percentile occupant to a larger penetration for a 95th percentile occupant.

To briefly summarize, when the frontal surfaces 172 of the driver's knees engage the side portions 74 of the knee restraint, the covering 84 and the foam material 82 cooperatively aid each other in pocketing the driver's knees to control any sliding movement of the driver's knees with respect to the side portions. It is assumed that the A points remain relatively stationary or that any movement thereof will have occurred prior to engagement of the frontal surfaces of the driver's knees with the knee restraint, as previously mentioned. If the kinetic energy of the lower torso of the driver is within certain predetermined limits, no deformation, of course, of the portions 80 will occur and when the lower torso rebounds with respect to the seat 14, the covering 84 and the foam material 82 will resume their initial shape. If the kinetic energy exceeds certain limits, then the frontal surfaces 172 of the driver's knees will engage the portions 80 through the covering 84 and the compressed portions of the foam material 82 between the frontal surface and the portions 80 and deform these portions and the plates 86. This deformation will, of course, absorb the kinetic energy of the lower torso of the driver and thereby limit the H point movement to acceptable limits as the knee points move about arcs generated about the relatively stationary A points. The resultants through the K and H points after such movement of the driver will be directed substantially coaxially of the femurs of the driver's lower torso and the resultant compressive loads will control the kinetics of the upper torso of the driver about the H point to position the upper torso with respect to the axis of the column 28. The degree of deformation of portions 80 and plates 86 will, of course, vary with the percentile of the occupant and the inertial force of the occupant's body.

From the foregoing description, it can be seen that this invention provides an occupant knee restraint for seated vehicle occupants which absorbs kinetic energy of movement of the occupant by impact deformation of the knee restraint by the occupant's knees and which also controls the kinematics of the occupant to position the upper torso of the occupant with respect to energy absorbing structure therefor, such as an energy absorbing steering column, to ensure adequate performance of such structure. The knee deformable portions of the particular driver knee restraint disclosed herein are connected by a center portion which is rigidly anchored to fixed vehicle body structure to ensure that no deformation of the deformable portions will detract from the overall steering column energy absorption performance. Likewise, the upper and lower edges of the deformable portions are anchored to fixed vehicle body structure to ensure that as much energy absorption as possible takes place through impact deformation of these portions and that the resultant compressive loads are applied axially of the driver's femurs and are within a predetermined limit.

What is claimed is:

1. The combination comprising, an automotive vehicle including an occupant compartment having an instrument panel, energy absorbing steering column means engageable by the upper torso of a seated driver to absorb kinetic energy therefrom, a knee restraint independent of said instrument panel and including plastically deformable portions of different extent laterally of the vehicle and engageable by the frontal surfaces of the driver's knees to absorb kinetic energy of the lower torso of the driver and apply a compressive load longitudinally of the femurs of such driver within predetermined tolerance limits to control the kinematics of the upper torso of the driver with respect to the energy absorbing steering column means, knee restraint support means mounted on said vehicle and located adjacent the lower edge of said instrument panel, means interconnecting said plastically deformable portions of said knee restraint and said support means and spacing said knee restraint rearwardly of said instrument panel, cover means extending between said instrument panel and said knee restraint and concealing said interconnecting means, means releasably interconnecting said cover means and said knee restraint to permit installation and removal of said cover means independently of said knee restraint, means controlling the rate of energy absorption of said plastically deformable portions of said knee restraint, and means equalizing the load received by said knee restraint support means from said plastically deformable portions of different extent.

2. The combination comprising, an automotive vehicle including an occupant compartment having an instrument panel, energy absorbing steering column means engageable by the upper torso of a seated driver to absorb kinetic energy therefrom, a knee restraint independent of said instrument panel and including plastically deformable portions having areas engageable by the frontal surfaces of the driver's knees to absorb kinetic energy of the lower torso of the driver and apply a compressive load longitudinally of the femurs of such driver within predetermined tolerance limits to control the kinematics of the upper torso of the driver with respect to the energy absorbing steering column means, knee restraint support means mounted on said vehicle and located adjacent the lower edge of said instrument panel, means interconnecting said plastically deformable portions of said knee restraint and said support means and spacing said knee restraint rearwardly of said instrument panel, cover means extending between said instrument panel and said knee restraint and concealing said interconnecting means, means releasably interconnecting said cover means and said knee restraint to permit installation and removal of said cover means independently of said knee restraint, reinforcement means incorporated in the knee engageable areas of said knee restraint deformable portions and weakening means incorporated in adjacent areas of said knee restraint for controlling the rate of energy absorption of said plastically deformable portions, and means equalizing the load received by said knee restraint support means from said plastically deformable portions.

3. The combination comprising, an automotive vehicle including an occupant compartment having an instrument panel, energy absorbing steering column means engageable by the upper torso of a seated driver to absorb kinetic energy therefrom, column support means mounted on the vehicle and secured to the steering column means, a knee restraint independent of said instrument panel and including plastically deformable portions of different extent laterally of the vehicle and engageable by the frontal surfaces of the driver's knees to absorb kinetic energy of the lower torso of the driver and apply a compressive load longitudinally of the femurs of such driver within predetermined tolerance limits to control the kinematics of the upper torso of the driver with respect to the energy absorbing steering column means, knee restraint support means mounted on said vehicle and located adjacent the lower edge of said instrument panel, means interconnecting said plastically deformable portions of said knee restraint and said support means and spacing said knee restraint rearwardly of said instrument panel, cover means extending between said instrument panel and said knee restraint and concealing said interconnecting means, means releasably interconnecting said cover means and said knee restraint to permit installation and removal of said cover means independently of said knee restraint, means controlling the rate of energy absorption of said plastically deformable portions of said knee restraint, and means connecting said knee restraint support means to said column support means at approximately one-half of the lateral extent of said knee restraint for equalizing the load received by said knee restraint support means from said plastically deformable portions of different extent.

4. The combination comprising, an automotive vehicle including an occupant compartment having an instrument panel, an energy absorbing steering column assembly engageable by the upper torso of a seated driver to absorb kinetic energy therefrom, column support means mounted on the vehicle and secured to said steering column assembly, a support member mounted on said vehicle and located adjacent the lower edge of said instrument panel and transversely of said column support means, a knee restraint independent of the instrument panel and including plastically deformable first portions located to each side of said steering column assembly for engagement by the frontal surfaces of said driver's knees, said first portions being of different extent laterally of the vehicle, flange means extending laterally of said first portions to said support member to space said first portions rearwardly of said instrument panel and support member, means securing said flange means to said support member, a cover assembly covering said flange means, cooperating releasable means on said first portions and said cover assembly and located underneath said cover assembly for releasably securing said cover assembly to said knee restraint in covering relationship to said flange means, said releasable means permitting installation and removal of said cover assembly independently of said knee restraint, means controlling the rate of energy absorption of said plastically deformable first portions, and bracket means securing said support member to said column support means at approximately one-half the lateral extent of said knee restraint for equalizing the load received by said support member from said plastically deformable first portions of different extent.

5. The combination comprising, an automotive vehicle including an occupant compartment having an instrument panel, an energy absorbing steering column assembly engageable by the upper torso of a seated driver to absorb kinetic energy therefrom, column support structure mounted on the vehicle and overlying said column assembly, means securing said column assembly to said support structure, a support member mounted on said vehicle and located adjacent the lower edge of said instrument panel and in overlying relationship to said column support structure, a knee restraint independent of the instrument panel and including plastically deformable first portions located to each side of said steering column assembly for engagement by the frontal surfaces of said driver's knees, said first portions being of different extent laterally of the vehicle, flange means extending laterally of said first portions to said support member to space said first portions rearwardly of said instrument panel and support member, means securing said flange means to said support member, a cover assembly covering said flange means, cooperating releasable means on said first portions and said cover assembly and located underneath said cover assembly for releasably securing said cover assembly to said knee restraint in covering relationship to said flange means, said releasable means permitting installation and removal of said cover assembly independently of said knee restraint, means controlling the rate of energy absorption of said plastically deformable first portions, and means rigidly connecting said support member to said column support structure adjacent said securing means and at approximately one-half the lateral extent of said knee restraint for equalizing the load received by said support member from said plastically deformable first portions.

* * * * *